Figures 1, 2:
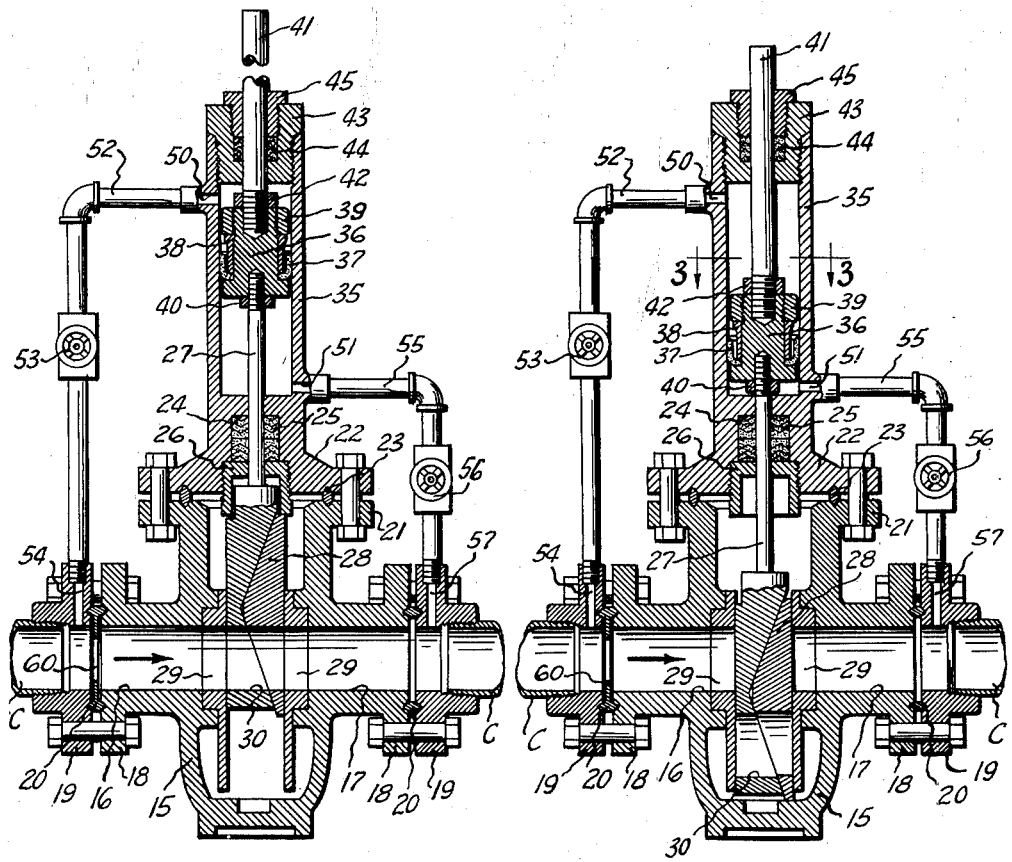

March 4, 1952        H. C. OTIS        2,588,284

FLUID PRESSURE DIFFERENTIAL RESPONSIVE CUTOFF VALVE

Filed July 9, 1946        4 Sheets-Sheet 1

Herbert C. Otis
INVENTOR.

BY *Eschatinge Ackley*

ATTORNEY

Herbert C. Otis
INVENTOR.

BY
ATTORNEY

March 4, 1952 H. C. OTIS 2,588,284
FLUID PRESSURE DIFFERENTIAL RESPONSIVE CUTOFF VALVE
Filed July 9, 1946 4 Sheets-Sheet 3

Herbert C. Otis
INVENTOR.

BY

ATTORNEY

March 4, 1952 H. C. OTIS 2,588,284
FLUID PRESSURE DIFFERENTIAL RESPONSIVE CUTOFF VALVE
Filed July 9, 1946 4 Sheets-Sheet 4
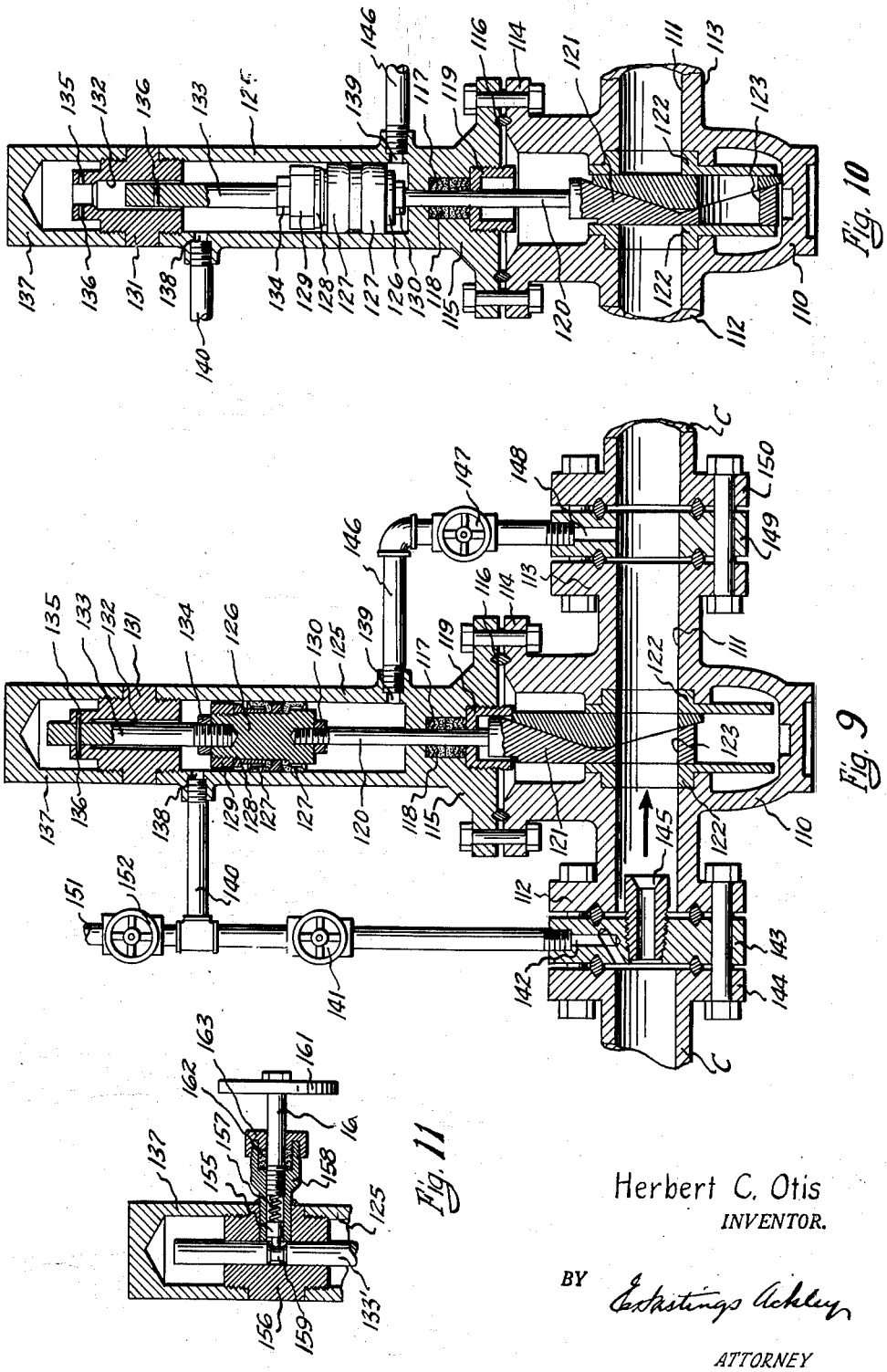
Herbert C. Otis
INVENTOR.
BY
ATTORNEY Patented Mar. 4, 1952

2,588,284

UNITED STATES PATENT OFFICE 2,588,284

FLUID PRESSURE DIFFERENTIAL RESPONSIVE CUTOFF VALVE

Herbert C. Otis, Dallas, Tex.

Application July 9, 1946, Serial No. 682,364

11 Claims. (Cl. 137—153)

This invention relates to new and useful improvements in safety devices.

One object of the invention is to provide a safety device which is adapted to be actuated by flowing fluids passing through the conductor in which the device is connected for controlling the flow through such conductor.

An important object of the invention is to provide a safety device of the character described which is arranged to close to completely shut off the flow through the flow conductor in which it is located upon the occurrence of a rate of flow in excess of a predetermined desired rate of flow through said conductor.

A particular object of the invention is to provide a safety device including a valve adapted to be connected in a flow conductor, and fluid pressure differential operated means for actuating the closure member of said valve to close the same to cut off flow through the conductor when a predetermined fluid pressure differential is applied to said actuating means.

A particularly important object of the invention is to provide a safety device having valve means which is arranged to normally remain wide open to permit a predetermined flow through the flow conductor and which is adapted to be automatically completely closed to positively shut off flow through said conductor upon the occurrence of a rate of flow in excess of such predetermined desired rate.

A further object of the invention is to provide a safety device of the character described having incorporated therein means resisting movement of the device to closed position, whereby the conditions under which the valve will close may be controlled and adjusted.

Another object of the invention is to provide a safety device of the character described which is arranged to be actuated by the pressure differential of the flowing fluids in the flow conductor in which the device is located, and wherein fluctuating normal velocities of flow, such as occur when the fluids flowing through the conductor head or surge, will not effect premature closure of the device, thereby providing for uninterrupted normal flow through the conductor.

A still further object of the invention is to provide a safety device including a valve adapted to be connected in a flow conductor and having an actuating means connected with the valve closure member for moving the same toward and from closed position, said actuating means being operated by the differential in fluid pressures applied to opposite sides of said means from separate points in the flow conductor, whereby a rate of flow creating an excessive drop in pressure downstream of the safety device or an excessive increase in pressure upstream of said safety device will cause said valve to close to shut off flow through the conductor.

A further object of the invention is to provide in a safety device of the character described means for dampening the action of the actuating means to prevent damage or destruction of the valve members in the event of sudden application of a high pressure differential across said actuating means.

Still another object of the invention is to provide a safety device of the character described wherein the pressure of the fluid trapped in the flow conductor when the valve element has been moved to closed position maintains the valve element closed to assure prevention of loss of fluid from the flow conductor after the safety device has closed to shut off flow.

Another object of the invention is to provide in a safety device of the character described means for causing the valve to reopen to permit resumption of flow through the conductor.

Figure 3:
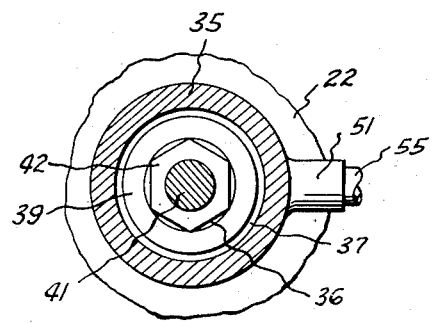
Figure 4:
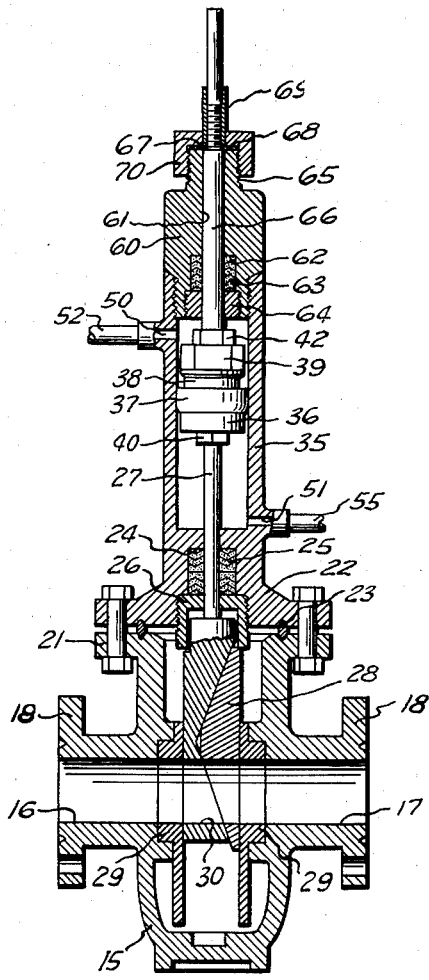
Figure 5:
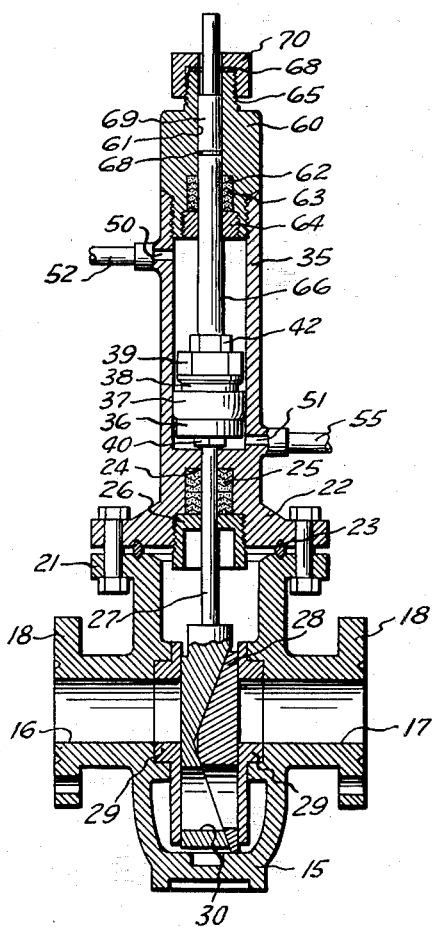
Figures 6, 7:
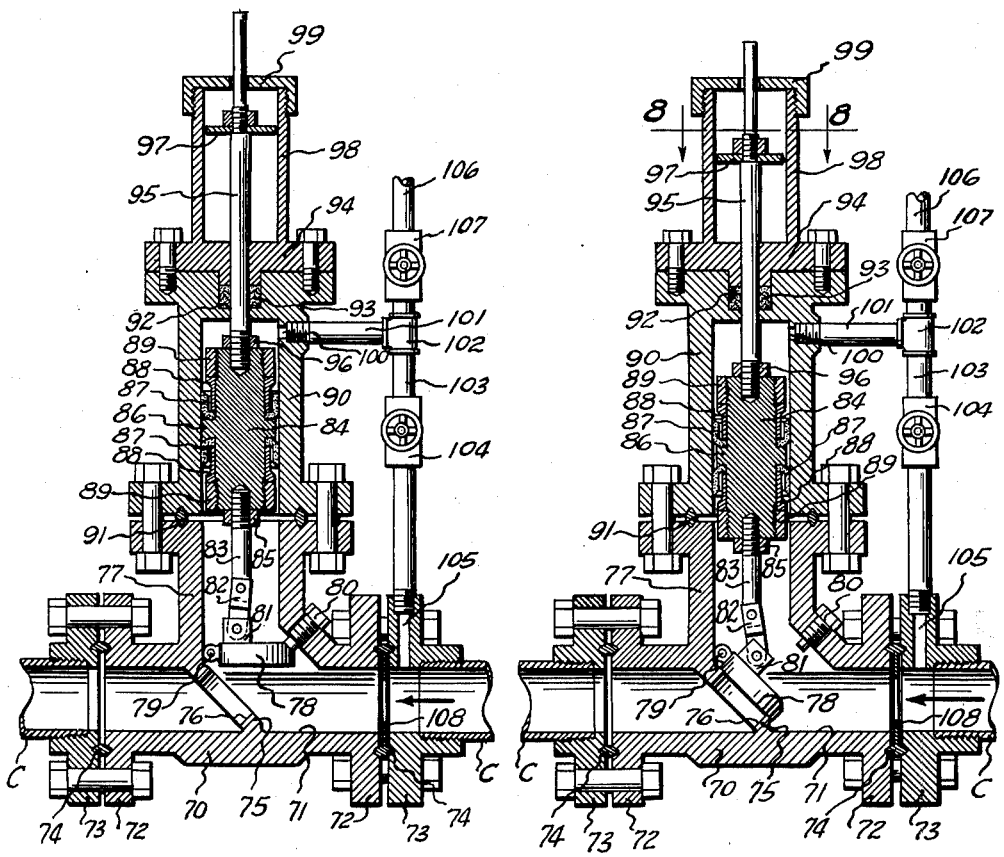
Figure 8:
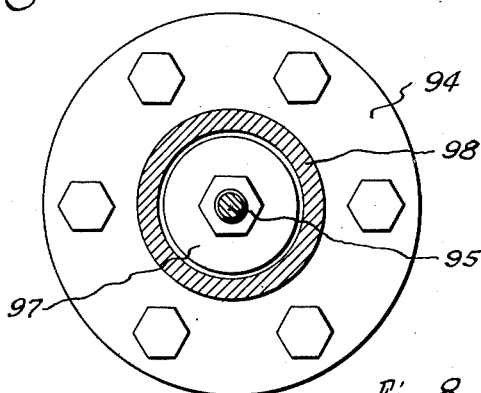

Additional objects and advantages of the invention will be apparent from a reading of the following description of devices constructed in accordance with the invention, and reference to the accompanying drawings thereof, wherein:

Figure 1 is a view, partly in elevation and partly in section, of a safety device constructed in accordance with the invention and connected in a flow conductor, showing the valve in open position, Figure 2 is a view, similar to Figure 1, showing the valve member in closed position, Figure 3 is an enlarged horizontal cross-sectional view of the actuating cylinder taken on the line 3—3 of Figure 3, Figure 4 is a view, partly in elevation and partly in section, of a modified form of the safety device of Figure 1 showing the valve in open position, Figure 5 is a view, similar to Figure 4, showing the valve of the safety device in closed position, Figure 6 is a view, partly in elevation and partly in section, of a safety device constructed in accordance with the invention, showing a different type of valve in open position, Figure 7 is a view, similar to Figure 6, showing the valve in closed position, Figure 8 is a horizontal cross-sectional view taken on the line 8—8 of Figure 7, Figure 9 is a view, partly in elevation and partly in section, of a modified form of the invention and showing the valve in open position, Figure 10 is a fragmentary view, similar to Figure 9, showing the valve in closed position, and Figure 11 is a fragmentary view of the upper portion of the safety device of Figure 9, illustrating a modified form of restraining means.

The numeral 15 designates a valve housing or casing having a lateral inlet opening 16 and a lateral outlet opening 17 disposed diametrically opposite each other and having external annular flanges 18 to which flanged connecting members 19 may be bolted for connecting the housing in a well flow conductor C. Sealing rings 20 prevent fluid leakage between the flanges. The upper end of the valve housing or body is provided with an external annular flange 21, by means of which a bonnet 22 may be bolted to the upper end of said housing to close the same. A sealing ring 23 prevents fluid leakage between the flange 21 and the bonnet 22. The bonnet is provided with an axial vertical opening which is enlarged to form a packing recess 24 in which a plurality of oppositely facing rings of chevron type packing 25 are confined by means of a gland nut 26 threaded into the lower end of the opening in the bonnet.

A valve stem 27 extends vertically through the bonnet into the bore of the housing and is connected to a gate type plug or closure 28 which is slidable vertically within the housing between identical opposing seats 29 mounted in the housing and surrounding the inlet and outlet openings therein. The valve closure or plug 28 is illustrated as being of the well known sectional wedge type, which is designed in such a manner that one of the wedge surfaced members of the closure element engages a portion of the housing to force the closure element into tight sealing engagement with the seats 29.

The valve closure or plug is provided with a transverse opening 30 in its lower portion which is adapted to be moved into alignment with the inlet and outlet openings of the housing to permit flow through said valve. When the valve closure plug is moved downwardly to the position illustrated in Figure 2, the solid portion of the plug is positioned in alignment with the openings to close the same against flow therethrough.

A valve actuating mechanism is provided on the upper end of the bonnet and includes an elongate vertical cylinder 35 which is preferably formed integral with the bonnet and is in vertical alignment with the valve stem 27. A piston 36, having a sealing cup 37 mounted thereon and held in place by means of a thimble 38 and a nut 39, is connected to the upper end of the stem 27 by screw threads and is securely held in place thereon by a lock nut 40.

An elongate rod 41 is threaded into the upper end of the piston and is securely held therein by means of a lock nut 42. The rod extends upwardly out of the upper end of the cylinder 35 and a cap 43, having a plurality of packing rings 44 held therein by gland nut 45, surrounds the rod and is threaded into the upper end of the cylinder.

A high-pressure inlet opening 50 provides for admission of fluid pressure into the bore of the cylinder 35 at its upper end adjacent the closure cap 43. A similar lateral inlet opening 51 for low pressure fluids is formed in the wall of the housing or cylinder 35 at its lower end. A fluid conductor or pipe 52 having a valve 53 therein is connected to the high pressure inlet 50 and leads to a radial opening 54 formed in the flange 19 connected to the upstream or inlet side of the valve housing. A similar fluid conductor or pipe 55 having a valve 56 therein is connected to a radial opening 57 formed in the flange 19 attached to the downstream or outlet side of the valve housing 15. It will be seen, therefore, that fluid pressure will be admitted through the opening 54 and conducted through the pipe 52 to the bore of the cylinder 35 above the piston 36, and will act downwardly thereupon. Similarly, fluid pressure will flow into the opening 57 through the pipe 55 and the inlet 51 to the bore of the cylinder below the piston 36 and will act on the under side of said piston.

From the foregoing, it will readily be seen that the fluid pressures will act upon opposite sides of the piston to move said piston, which acts through the stem 27 to move the closure or plug 28.

Actuating movement of the piston is effected by a fluid pressure differential which is created by an orifice plate or disc 60 formed integral with the sealing ring 20 at the inlet end of the housing and which serves to restrict flow from the conductor into the valve housing. Thus, a pressure differential is created upon opposite sides of said orifice plate or disc and the pressure fluid from the upstream or high pressure side of the orifice plate is conducted through the opening 54, the pipe 52 and the inlet 50 to the bore of the cylinder 35 above the piston 36, while the pressure fluid from the downstream or low pressure side of the disc or plate 60 is conducted by means of the opening 57 and the pipe 55 through the inlet 51 to the lower portion of the bore of the cylinder 35 below the piston 36. It will readily be seen, therefore, that the high pressure acting upon the upper side of the piston normally tends to move the same downwardly to close the valve plug 28 to prevent further flow through the housing, while the lower pressure acting upon the under side of said piston normally tends to urge the piston upwardly to resist downward movement thereof.

However, the cross-sectional area of the rod 41 connected to the upper end of the piston and having its upper end extending out of the cylinder 35 and exposed to only atmospheric pressure serves to negative or balance out an equivalent area of the upper surface of the piston which is exposed to the high pressure, whereby the effective area of the upper surface of the piston exposed to the downward force of the high pressure fluid present in the upper portion of the cylinder is reduced or diminished by an amount equivalent to the cross-sectional area of the rod 41. Therefore, the effective downward force of the high fluid pressure acting upon the upper surface of the piston is reduced by the provision of the rod 41, and the cross-sectional area of said rod may be so selected as to require the application of a desired predetermined fluid pressure differential to the opposite surfaces of the piston to cause said piston to move downwardly. As a result, fluid pressure differentials less than the desired predetermined differential acting upon the opposing surfaces of the piston will not move the piston downwardly, since the downward force of the high pressure acting upon the reduced effective area of the upper side of the piston will not be sufficient to overcome the upward force of the lower pressure acting upon the area of the under side of said piston less the area of the valve stem 27, plus the force of the fluid pressure in the valve housing acting upwardly on the cross-sectional area of the valve stem.

It will be seen, therefore, that the diameter of the rod 41 may be so selected that the cross-sectional area thereof will negative a sufficient area of the upper surface of the piston to reduce the effective area thereof to such a value that such effective area will be sufficiently smaller than the full effective area of the under side of the piston to require the application of at least a predetermined desired fluid pressure differential to the opposed sides of the piston before said piston will be moved downwardly to close the valve plug. It is also manifest that, for all flowing conditions of the fluids flowing through the conductor creating a fluid pressure differential less than the desired predetermined differential, the piston will not be moved and the valve will remain fully open.

Since the pressure reduction or differential created by the orifice plate is dependent upon the size of the orifice opening therethrough and the rate of flow of fluids through the conductor, the size of the orifice opening is so selected that for all normal desired rates of flow the pressure differential created across said orifice plate is not equal to or in excess of the predetermined desired differential necessary to cause the piston 36 to move downwardly to close the valve. Thus predetermined desired normal rates of flow of fluid through the conductor are permitted, but when for any reason the rate of flow of the fluids is increased, as by breakage of the flow conductor downstream of the safety device or for any other reason, to a rate in excess of the predetermined desired maximum normal rate, the pressure differential created thereby across the orifice plate will be increased to a value in excess of the predetermined desired differential required to cause the piston 36 to move downwardly. As a result, the differential in the pressures conducted to and acting upon opposite sides of the piston 36 will be increased to a point at which the high pressure acting upon the upper and effectively smaller area of the piston sufficiently exceeds the low pressure acting on the effectively larger area of the under side of the piston to cause the piston to move downwardly to force the valve stem and the valve closure or plug 28 connected therewith downwardly to close off flow through the housing 15, as shown in Figure 2. The valve plug will be positively moved to completely closed position, since the energy applied to the piston is increased by the flow restricting action of the plug as its solid portion moves across the flow openings through the housing.

From the foregoing, it will be seen that, by varying the cross-sectional area of the rod 41, the pressure differential required to actuate the piston to close the valve may be predetermined and controlled in such a manner as to cause accurate predetermined conditions to be met before the valve will be closed. For example, if the effective cross-sectional area of the piston be assumed to be six square inches and the downstream pressure acting upon the under side of the piston be assumed to be 1,000 pounds per square inch, it will be seen that an effective upward force of 6,000 pounds will be acting upon the piston to move the same upwardly. Also, if the cross-sectional area of the rod 41 be assumed to be equal to approximately 0.4 of one square inch, the effective area of the upper side of the piston exposed to downward pressure will be 5.6 square inches and a pressure of approximately 1,071 pounds per square inch will be required to create an effective downward force sufficient to balance the upward force acting upon the piston because of the 1,000 pound per square inch pressure below the same. Now, should it be assumed that the pressure acting on the under side of the piston were, for example, 900 pounds per square inch, while the pressure acting upon the upper side of the piston is maintained at approximately 1,071 pounds per square inch, it will readily be seen that the piston will be forced downwardly by the high pressure acting upon the upper side of the piston, since a downward force of approximately 6,000 pounds will be acting upon the piston while an upward force of only approximately 5,400 pounds will be acting upwardly thereon.

By changing the cross-sectional area of the rod 41 to one inch, it will be seen that the effective area of the upper side of the piston exposed to the high pressure will be only approximately 5 square inches and will require a higher pressure, in excess of approximately 1,200 pounds per square inch, to overcome the upward force of the low pressure of 1,000 per square inch acting upon the under side of the piston. Therefore, the pressure differential required to actuate the piston and cause the same to move the valve closure or plug member 28 to closed position may be controlled by controlling the cross-sectional area of the rod 41.

As has already been pointed out, for desired normal rates of flow the pressures on opposite sides of the orifice plate or disc 60 will be substantially equal or only slightly different and such differential will not be adequate to cause operation of the piston. However, should the flow conductor break on the downstream side of the safety device or be opened to excessive flow therethrough, so as to cause a pressure drop at the orifice plate equal to or in excess of the predetermined differential necessary to move the piston, the differential so created will actuate the piston to cause the same to move the valve plug to closed position. Therefore, loss of fluid or fluid pressure which might result because of breakage of the flow conductor on the downstream side of the safety device will be prevented by closure of the safety device. It is manifest that such closure is effected automatically and substantially instantaneously that the predetermined pressure differential is created across the orifice plate or disc 60 by such increased flow.

It is within the scope of this invention, and it is so claimed, to connect the downstream or low pressure pipe 55 at a remote point in the well flow conductor C in such a manner as to utilize the normal flow stream losses in pressure caused by sharp bends or curves in the pipe or conductor C, or the pressure reduction caused by meter runs or the like, for operating the valve rather than utilizing the orifice disc 60. In such case, the disc 60 may be omitted.

Since there is normally a higher pressure present in the cylinder 35 above the piston 36 and the cup 37 confined thereon, the single cup will, under normal conditions, effectively seal the higher pressure above the piston from the lower pressure therebelow. If desired, however, the piston 36 may be provided with a downwardly facing cup to seal off pressures acting against the under side of the piston.

In order to open the valve, fluid pressures on opposite sides of the actuating piston 36 are equalized by by-passing the fluid pressure from the upstream side of the valve to the downstream side thereof, whereby such fluid pressure may pass through the opening 57, the pipe 55 and the inlet 51 to the bore of the cylinder 35 below the piston. When the force of the pressure acting upwardly against the full effectively larger area of the underside of the piston becomes greater than the force of the pressure acting downwardly upon the reduced effective area of the upper side of the piston, the piston will be moved upwardly and the valve closure plug 28 will thus be lifted to the position shown in Figure 1, whereupon the transverse opening 30 in said plug is positioned in alignment with the flow passage through the valve and fluids may flow therethrough. Such reopening of the device is possible because of the reduced effective area of the upper side of the piston provided for by the rod 41.

A slightly modified form of the safety device is illustrated in Figures 4 and 5, wherein the valve and actuating means are identical with those of the form previously described and are given the same identifying numerals. The cap member 43 of the form previously described is removed, however, and a closure head 60 is substituted therefore. The closure head is screw-threaded into the upper end of the cylinder 35 and is provided with an axial bore 61 which is enlarged at its lower end to provide a packing recess 62 in which a plurality of downwardly facing rings of chevron type packing 63 are confined by means of a gland nut 64 threaded into the extreme lower end of the bore of the closure member. The upper portion of the closure 60 is reduced in diameter and provided with external screw threads 65.

An elongate rod 66 similar to the rod 441 is screw-threaded into the upper end of the piston 36 and is held securely connected thereto by means of a lock nut 42 in the same manner as the rod 41 of the form previously described. The upper portion of the rod 66 is reduced in diameter to provide an upwardly facing shoulder 67 against which a shear washer 68 is tightly engaged by means of a sleeve 69 which is threaded onto the reduced portion of the rod. The external diameter of the sleeve 69 is substantially the same as that of the large portion of the elongate rod, whereby said sleeve forms a continuation of said rod. The shear washer 68 is adapted to engage against the upper end of the reduced portion 65 of the closure head 60 and to be confined thereagainst by a cap nut 70 which is screw-threaded onto the reduced portion 65 of the closure head. The cap nut 70 is provided with an axial opening through which the rod 66 extends, as clearly shown in Figure 4.

The shear washer 68 provides means for positively controlling the conditions under which the piston 36 will be moved downwardly to close the valve. When a sufficient differential in the pressures above the piston and below the piston occurs, the resultant downward force acting upon the piston will serve to shear the washer 68 to permit the piston to move downwardly and, in turn, move the stem 27 downwardly to force the closure plug 28 to the closed position illustrated in Figure 5.

The washer 68 may be formed of any suitable material, such as brass, copper, lead, thin steel or the like. By varying the thickness of the shear washer, the force necessary to shear said washer and move the piston downwardly can be accurately controlled. Therefore, the actuating means of the safety device may be accurately set to require the action of at least a predetermined fluid pressure differential upon the piston 36 to shear said washer to permit the piston to move downwardly to close the valve. Obviously, a low pressure from downstream of the safety device may be conducted to the bore of the cylinder 35 below the piston. Or, if desired, the opening 51 may be left open to atmospheric pressure only.

The functioning of the safety device of this modified form, illustrated in Figures 4 and 5, is identical with that of the form previously described, except that the shear washer 68 controls, in combination with the reduced effective area of the upper side of the piston, the pressure differential required to actuate the valve to shut off flow through the flow conductor.

After the valve has once been closed to shut off flow, it may be re-opened in the same manner as that of the form previously described and a new shear washer installed on the elongate rod 66 between the shoulder 67 and the sleeve 69 and clamped between the upper end 65 of the closure head and the cap nut 70. When the valve has been reopened and a new washer has been installed, the safety device is again ready for use.

Another modification of the safety device is shown in Figures 6 through 8 inclusive wherein a hinged disc or flapper type valve is illustrated as being actuated by the actuating means. The device includes a valve housing 70 having a transverse flow passage 71 therethrough. At each end of the flow passage the body is provided with external flanges 72 by means of which it may be connected to the flanged coupling members 73 of a flow conductor C. Sealing rings 74 interposed between the flanges prevent fluid leakage therebetween. An angularly disposed partition 75 is formed in the flow passage 71 and has an opening 76 therethrough, said partition providing a valve seat.

The valve body or housing 70 is provided with a hollow vertical section 77 which communicates with the flow passage 71, and a disc-like flapper type closure member 78 is hinged within the lower portion of said vertical section adjacent the upper end of the partition 75, as clearly shown in Figure 6. The disc or closure member 78 is adapted to swing about the hinge 79 from the open position shown in Figure 6 to the closed position shown in Figure 7. A stop screw 80 extending through the wall of the body is provided for limiting the upward movement of the disc or closure 78 to the position illustrated in Figure 1.

The upper side of the closure disc is provided with an upstanding ear or lug 81 to which a yoke link 82 is swingably pinned. The upper free end of the yoke link is swingably connected to the lower end of a stem 83 which is connected by screw threads to the lower end of a piston 84 and depends axially therefrom. A lock nut 85 is threaded on the stem and against the lower end of the piston to prevent displacement of the stem from its connection to the piston.

The piston is substantially cylindrical and has a central annular flange 86 which is undercut on each side and against which oppositely facing sealing cup rings 87 abut. The sealing cups are held in engagement with the shoulder 86 by thimbles 88 and sealing nuts 89 which are threaded on to each end of the piston, as clearly shown in Figure 6.

The piston 84 is adapted to move vertically within the bore of an elongate cylindrical housing 90 which is bolted to the upper end of the vertical section 77 of the housing of the valve. A sealing ring 91 interposed between the cylinder and the vertical section 77 prevents fluid leakage past the adjacent ends of said members. The upper end of the bore of the cylinder 90 is reduced to provide a packing receptacle 92 in which a plurality of downwardly facing chevron type sealing rings 93 are confined by means of a gland-like cap washer 94 which is bolted to the upper end of said housing. An elongate rod 95 is screwthreaded into the upper end of the piston 84 and extends axially upward from the upper end of said piston through the packing rings 93 and the gland washer 94. A lock nut 96 threaded onto the rod engages against the upper end of the piston to securely hold said rod connected to said piston.

The upper portion of the rod 95 is reduced in diameter and provided with external screw threads for receiving a damper disc 97 which is slidable within a damper dash-pot 98 extending axially upwardly from the upper surface of the gland washer 94. A cap 99 having an axial opening therein is threaded onto the upper end of the damper dash-pot 98, and the extreme upper end of the rod 95 is adapted to extend upwardly through and above said cap. The diameter of the damper washer 97 is slightly less than the inside diameter of the bore of the dash-pot 98, whereby oil or other fluid may pass therebetween when placed within said dash-pot to act as a dampening agent as the damper disc 97 moves downwardly within the dash-pot. Due to the relatively close fit between the periphery of the disc and the inner wall of the dash-pot, it will be seen that the fluid within the dash-pot will pass slowly therebetween to a point above the disc as said disc and the elongate rod are moved downwardly, thus affording a dampening or restraining means resisting downward movement of the rod and the piston connected thereto.

A lateral inlet port 100 is formed in the wall of the cylinder 90 near the upper end of the large portion of the bore thereof and is adapted to have a conductor pipe 101 threadedly connected thereto. The outer end of the pipe 101 is connected to a T 102, one arm of which is connected with a pipe 103 and a valve 104 communicating with the conductor C by means of a port 105 formed radially in the flanged connecting member 73 on the upstream side of the valve, whereby fluid pressures within the conductor C may pass through the opening 105, the valve 104, the pipe 103, the T 102, the pipe 101 and the port 100 to the bore of the cylinder above the piston 84. The other arm of the T 102 has an exhaust or vent pipe 106 connected thereto which is provided with an exhaust valve 107. The exhaust pipe 106 and valve 107 are used for venting fluid pressure from within the cylinder above the piston in a manner and for a purpose which will be hereinafter described.

An orifice plate or disc 108 is preferably formed integral with the sealing ring 74 at the upstream end of the flow passage through the valve body for creating a pressure reduction which will, under predetermined conditions, actuate the piston 84 to cause the same to move downwardly to force the flapper disc or closure 78 to the closed position illustrated in Figure 7.

The under side of the piston 84 is exposed to the lower fluid pressure downstream of the orifice plate 108, said fluid pressure passing through the flow passage 71 and upwardly through the hollow vertical section 77 of the housing to the lower portion of the cylinder 90 to act against the under side of said piston. The higher pressure on the upstream side of the orifice plate 108 will pass upwardly through the opening 105, the pipe 103, the valve 104, the T 102, the conductor 101 and the port 100 into the upper portion of the bore of the cylinder 90 above the piston and act downwardly thereon.

Since the full effective cross-sectional area of the under side of the piston is exposed to the lower downstream fluid pressure, it will readily be seen that the effective cross-sectional area of the upper side of the piston, which is reduced by an amount equal to the cross-sectional area of the rod 95 which is exposed to atmosphere, must be acted upon by a higher pressure than that below the piston to cause downward movement thereof, as has already been explained.

In the event of breakage of the flow conductor on the downstream side of the safety device, or a reduction in pressure on the downstream side of the orifice plate 108 for any reason, resulting in an increase in the rate of flow through the conductor and creating a pressure reduction or pressure differential across said plate equal to or in excess of the differential required to move the piston, the lower pressure acting upon the under side of the piston 84 will be overcome by the higher pressure acting upon the upper side of said piston and the piston will be forced downwardly. As the piston is moved downwardly, the stem 83 will move downwardly and move the yoke link 82 downwardly to swing the disc or closure 78 about the hinge 79 to the closed position shown in Figure 7 to close off flow through the flow passage 71 of the housing.

Normally, when the disc or closure 78 enters the path of flow of fluids through the flow passage 71, the impact of said fluids upon said disc will increase the velocity of motion of the disc toward closed position, and might result in breakage or severe damage to the disc or the seat 76. To prevent such acceleration of downward or closing movement of the disc, the dash-pot 98 and disc 97 have been provided. The resistance of the disc 97 passing through the oil or other fluid contained in the dash-pot 98 will slow down or resist an increase in the rate of movement of the closure disc 78 toward its closed position and thus prevent damage to said closure disc.

Manifestly, the principle of operation of this form of safety device is the same as that of the forms previously described, there being merely a slight difference in construction and the addition of a modified form of restraining means for preventing undue acceleration of movement of the closure disc 78 to closed position.

To reopen the valve after it has been closed, it is only necessary to close the valve 104 in the pipe 103 to prevent fluid pressure from the upstream side of the orifice plate from entering the bore of the cylinder above the piston, and to open the exhaust or vent valve 107 to permit the fluid pressure trapped within the cylinder above the piston to escape through the vent pipe 106. As the trapped fluid pressure escapes, an upward pressure differential from below the piston will act to move said piston upwardly to open the valve to permit resumption of flow through the device. Or, the valve may be opened by equalizing the fluid pressures on opposite sides of the piston in the manner previously described.

After the valve has been opened in the aforesaid manner, the exhaust valve 107 is closed and the valve 104 is opened to again establish communication between the flow conductor and the bore of the cylinder above the piston. The valve will then function in the manner already described, to shut off flow through the conductor in the event of an increase in the rate of flow through the conductor creating a pressure reduction across the orifice plate 108 sufficient to cause actuation of the piston.

A further modification of the safety device is illustrated in Figures 9 through 11 inclusive. The device includes a valve housing or casing 110 having a transverse flow passage 111 therethrough with a flanged inlet opening 112 and a flanged outlet 113. The upper end of the valve body or housing is provided with an external annular flange 114 by means of which a bonnet 115 may be bolted to said housing for closing the bore of the same. A sealing ring 116 interposed between the flange and the bonnet prevents fluid leakage therebetween. The bonnet is provided with an axial vertical opening which is enlarged to form a packing recess 117 in which a plurality of oppositely facing rings of chevron type packing 118 are confined by means of a gland nut 119 threaded into the lower end of said opening.

A valve stem 120 extends vertically through the bonnet into the bore of the housing and is connected to a gate type plug or closure 121 which is slidable vertically within the housing between identical opposing seats 122 mounted therein surrounding the inlet and outlet portions of the flow passage 111. The valve closure or plug is illustrated as being of the well-known sectional wedge type, which is so designed that one of the wedged surface members of the closure element engages a portion of the housing to force the closure element into tight sealing engagement with the seats 122, but may be of any suitable desired type.

The closure or plug 121 is provided with a transverse opening 123 in its lower portion which is adapted to be moved into alignment with the flow passage 111 through the housing to permit flow through the valve. When the valve closure plug is moved downwardly to the position illustrated in Figure 10, the solid portion of the plug is positioned in alignment with the flow passage to close the same against flow through the valve.

Mounted on the upper end of the bonnet is a valve actuating mechanism including an elongate vertical cylinder 125 which is preferably formed integral with the bonnet and in vertical alignment with the bore of the housing. A piston 126, having a pair of oppositely facing sealing cups 127 mounted thereon and held in place by means of a thimble 128 and a packing nut 129, is connected to the upper end of the valve stem 120 by screw threads and is securely held in place thereon by a lock nut 130. A bushing 131 is screw-threaded into the upper end of the cylinder 125 and is provided with an axial opening 132 through which a vertically extending restraining rod 133 is adapted to slide. The restraining rod is screw-threaded into the upper end of the piston 126 and is held securely connected thereto by a lock nut 134. The upper portion of the bushing 131 is reduced in external diameter and a transverse opening 135 is formed in this reduced portion and through the restraining rod 133, as is clearly shown in Figure 9.

A shear pin 136 is mounted in the opening 135 and is adapted to resist downward movement of the restraining rod and the piston 126 connected thereto, whereby downward closing movement of the plug or closure member 121 is normally prevented. A cap 137 is screw-threaded onto the upper end of the bushing surrounding and enclosing the reduced upper portion thereof and the upper end of the restraining rod, and said cap provides a closure preventing fluid leakage from within the upper portion of the cylinder.

A high pressure inlet opening 138 is formed in the wall of the cylinder 125 just below the lower end of the bushing 131 and provides for admission of fluid pressure into the bore of the cylinder above the piston. A similar lateral inlet opening 139 is formed in the wall of the cylinder at its lower end below the piston for admitting low pressure fluid to the bore of the cylinder.

A fluid conductor or pipe 140 having a valve 141 therein is connected to the high pressure inlet 138 and leads to a radially extending opening 142 formed in a disc or plate member 143 which is bolted between the flanged end 112 of the inlet opening of the valve housing and a flanged connecting member 144 of a flow conductor C. An exhaust or vent pipe 151 having an exhaust valve 152 therein is connected to the pipe 140 between the valve 141 and the high pressure inlet opening 138 to permit opening the safety device, as will hereinafter be explained, after said safety device has closed.

The disc 143 is provided with a threaded opening therethrough in axial alignment with the bore of the conductor C and the flow passage 111 of the valve housing, and a flow restricting or choke member 145 is screw-threaded into said opening for the purpose of creating a pressure drop or reduction at that point upstream of the safety device.

A low pressure fluid conductor or pipe 146 having a valve 147 therein is connected to the low pressure inlet 139 and leads to a radial opening 148 formed in a spacer member 149 which is adapted to be bolted between the flanged outlet end 113 of the valve housing and a flanged connecting member 150 provided on the end of a section of the flow conductor C, whereby the valve housing is connected in the flow conductor and the low pressure fluid may be conducted to the bore of the cylinder 125 below the piston therein.

In operation, the device is connected in the flow conductor in the manner just described and fluid is permitted to flow through the conductor. As the fluid flows through the flow restricting choke 145, a pressure reduction is effected thereacross on the upstream side of the safety device. It is preferable, as has already been explained, that the pressure reduction so created be such that it will not materially affect normal flowing operations through the conductor. The higher pressure upstream of the choke 145 will be conducted through the opening 142, the pipe 140 and high pressure opening 138 to the bore of the cylinder 125 above the piston therein. The lower fluid pressure downstream of the choke 145 will be conducted through the radial opening 148, the conductor pipe 146 and the low pressure opening 139 to the bore of the cylinder below the piston.

It will be seen, therefore, that the unequal fluid pressures upstream and downstream of the flow restricting choke will act upon opposite sides of the piston and tend to move said piston downwardly to force the valve stem 120 downwardly and move the closure plug 121 to closed position to shut off flow through the valve housing. Such downward movement of the piston is normally prevented or restrained by the shear pin 136 extending through the upper end of the bushing 131 and the restraining rod 133. The diameter of the shear pin may be so selected that a desired predetermined fluid pressure differential must be applied to the opposed surfaces of the piston to create sufficient downward force to shear the pin and move the piston downwardly. Obviously, flow conditions which create differentials less than that required to shear the pin cannot move the piston, and such normal flowing conditions will not effect closure of the safety device. However, should there be an increase in the rate of flow through the conductor creating a pressure reduction across the choke equal to or in excess of the differential required to shear the pin 136, or should the flow conductor break downstream of the safety device and release the pressure therein to atmosphere, the pressure differential so created will urge the piston downwardly with adequate force to shear the pin 136 and permit the piston to be moved downwardly to force the closure plug 121 to the closed position shown in Figure 10.

In this form of the safety device, the entire upwardly facing cross-sectional area of the piston 126 is exposed to the high pressure trapped thereabove within the cylinder 125, and the amount or value of the fluid pressure differential required to actuate the piston is determined by the size of the shear pin 136. Thus, by changing the diameter of the shear pin, the operator may predetermine the pressure differential necessary to effect closure of the valve and thereby control the conditions under which the valve will close to prevent loss of fluid or fluid pressure from within the flow conductor C. Also, the orifice through the flow restricting choke 145 may be changed in size to change the pressure reduction or pressure drop created across said choke to meet varying flow conditions, as has been previously set forth.

Manifestly, the spacer member 149 may be located at a remote point downstream of the safety device, if desired, whereby the pressure losses or pressure reductions created by sharp turns or bends in the conductor or by meter runs or the like may be utilized as the means for creating the pressure differential applied to the opposite sides of the actuating piston 126, and whereby the flow restricting choke may be omitted.

The valve may be opened by closing the valve 141 to prevent fluid pressure from the upstream side of the choke from entering the bore of the cylinder above the piston and opening the exhaust valve 152 to permit the fluid pressure trapped within the cylinder above the piston to escape through the vent pipe 151. Fluid pressure from upstream of the valve is by-passed to the downstream side thereof. Such by-passed fluid pressure will enter the cylinder below the piston to create an effective upward pressure differential upon the piston, to cause the same to move upwardly to lift the closure plug 121 to open position and to realign the openings 135 through the upper end of the bushing 131 and the restraining rod 133, whereupon a new shear pin may be placed in said openings and the device again placed in operation.

If desired, the shear pin 136 may be omitted and a different type of restraining means employed for resisting downward movement of the actuating piston 126. One such resisting means is illustrated in Figure 11 and includes a spring-pressed plunger 155 urged radially inwardly of a bushing 156, screw-threaded into the upper end of the cylinder 125, by a spring 157. The spring and the plunger 155 are slidably mounted in a housing 158 mounted radially of the bushing. The inner reduced rounded end of the plunger is adapted to engage in a bevel-edged annular recess 159 formed in the periphery of the upper portion of the restraining rod 133' to resist downward movement of said rod. The pressure exerted by the spring 157 is controlled by manipulation of an adjusting screw 160 which is screw-threaded into the bore of the housing 158 and engages the outer end of the spring. A handle 161 permits ready adjustment of the screw. Packing rings 162 are mounted in an enlargement of the outer portion of the bore of the housing 158 and are confined therein surrounding the screw by a gland nut 163 which is threaded onto the outer end of the housing. The beveled surface at the upper end of the recess 159 engages the inner end of the plunger 155, whereby downward movement of the restraining rod 133' is resisted. However, upon application of a sufficient downward force upon the piston 126, the beveled surface at the upper end of the recess forces the plunger outwardly against the pressure of the spring to permit the restraining rod to move downwardly, whereby the piston forces the closure 121 to closed position.

From the foregoing, it will be seen that a safety device has been provided which is adapted to be connected in a fluid flow conductor for the purpose of controlling the flow through such conductor, to positively and completely shut off flow therethrough or to prevent loss of pressure or fluid from the conductor, in the event of the occurrence of predetermined flow conditions. It will further be seen that the safety device is adapted to be actuated by the flowing fluids passing through the conductor to shut off flow through such conductor when a predetermined fluid pressure differential is applied to actuating means for effecting closure of the safety device. It will particularly be noted that the safety device is provided with actuating means having incorporated therein means for resisting movement of said actuating means which would cause the device to shut off flow through the conductor, whereby the conditions under which the safety device will close may be accurately controlled and adjusted. The restraining means may, as has been pointed out herein, include means for balancing out a portion of the effective area of the actuation piston exposed to the high upstream fluid pressure, or may include yieldable or shear means resisting actuating movement of the piston, or may include a combination of both balancing means and shear means, or other suitable means.

It will also be seen that the device is adapted to be actuated from fully open to fully closed position by fluid pressure differentials created by the fluids flowing through the flow conductor in which the device is located, and wherein fluctuating velocities of flow such as occur when the fluid's head or surge will not effect premature closure of the device, whereby uninterrupted normal flow through the conductor is permitted. Further, means has been provided for dampening the action of the actuating piston to prevent damage or destruction of the valve members of the safety device in the event of sudden application of a high pressure differential across the actuating piston. Also, means has been provided causing reopening of the safety device after it has been closed to shut off flow.

The foregoing description of the invention is explanatory only, and changes in the details of the constructions illustrated may be made by those skilled in the art, within the scope of the appended claims, without departing from the spirit of the invention.

What I claim and desire to secure by Letters Patent is:

1. A safety device including, a housing adapted to be connected in a flow conductor and having a flow passage therethrough, valve means in said housing for controlling flow through said passage, a cylinder carried by said housing, a piston movable in said cylinder and operatively connected with said valve means for actuating the same, a rod connected to the surface of the piston opposite the connection to the valve means and extending exteriorly of the cylinder so as to be exposed to atmospheric pressure whereby the effective area of such piston surface is reduced, means for applying fluid pressures to the opposed surfaces of said piston to cause movement thereof in response to the differential in said pressure to effect operation of the valve means, and means connected with the rod exteriorly of the cylinder for dampening the movement of said piston to dampen movement of said valve means.

2. A safety device including, a housing adapted to be connected in a flow conductor and having a flow passage therethrough, valve means in said housing for controlling flow through said passage, a cylinder carried by said housing, a piston movable in said cylinder and operatively connected with said valve means for actuating the same, a member connected with the surface of the piston opposite the valve means connection and extending exteriorly of the cylinder so as to be exposed to atmospheric pressure whereby the effective area of such surface of the piston is reduced to provide unbalanced opposed areas on the piston, flow restricting means connected with the flow passage of the housing for creating a pressure reduction in the fluid flowing through the conductor, and means for conducting the fluid pressures from opposite sides of the flow restricting means to the opposed areas of the piston for actuating the same, the unbalance of the opposed areas of the piston normally restraining the piston in a position holding the valve means open.

3. A fluid flow shut-off device for a flow conductor including, a housing adapted to be connected in a flow conductor and having a flow passage therethrough, valve means movable in said housing, a cylinder carried by the housing, a piston movable in said cylinder operatively connected with said valve means for actuating the same and having opposed areas exposed to fluid pressures within the cylinder, a flow restricting member connected with the flow passage of the housing, fluid flow conductors communicating with opposite sides of said flow restricting member and with the cylinder for conducting pressure fluids from opposite sides of said flow restricting member to said opposed areas of said piston for causing said pitson to move in response to the differential in said pressures to effect closure of the valve means, and means operatively connected with the piston opposite the valve means and movable therewith and having a surface exposed to atmospheric pressure exteriorly of the cylinder whereby the fluid pressure within the cylinder on one side of the piston acts upon said means to effectively reduce the force applied by such fluid pressure to such side of the piston to restrain said piston against operation of the valve means until at least a predetermined pressure differential is applied to said piston.

4. A safety device including, a valve housing adapted to be connected in a flow conductor and having a flow passage therethrough, a valve closure member movable in the housing for opening and closing the flow passage, a cylinder carried by the housing, a piston movable in the cylinder and having opposed pressure receiving surfaces, means operatively connecting the valve closure member with the piston whereby movement of the piston in the cylinder moves the closure member in the housing, a first conductor for conducting pressure fluid from upstream of the valve closure member to the cylinder for acting upon one surface of the piston to urge said piston in a direction which will move the valve closure member toward closed position, a second conductor for conducting pressure fluid from downstream of the valve closure member to the cylinder for acting upon the opposite surface of the piston to urge said piston in a direction which will move the closure member toward open position, and a rod removably and interchangeably connected with the surface of the piston exposed to upstream fluid pressure and extending exteriorly of the cylinder whereby the cross-sectional area of the rod extending exteriorly of the cylinder is exposed to atmospheric pressure and the effective area of the surface of the piston to which said rod is connected is reduced so that when the fluid pressures applied to the opposed surfaces of the piston are equal the piston will urge the valve closure member to open position and will maintain said closure member in such open position until the fluid pressures acting upon said piston are unbalanced to such a degree that a sufficient pressure differential is applied to said piston to urge said piston in a direction moving the closure member toward closed position, the cross-sectional area of the rod extending exteriorly of the cylinder controlling and predetermining the pressure differential required to be applied to the piston to move the closure member to closed position.

5. A safety device of the character set forth in claim 4 including, yieldable means connected with and acting upon the rod exteriorly of the cylinder to restrain movement of the piston in a direction moving the valve closure member toward closed position and yieldable to permit such movement of the piston upon the application of a predetermined pressure differential to said piston, said yieldable means then being ineffective to restrain movement of the piston and valve closure member.

6. A safety device of the character set forth in claim 4 including, means for equalizing the pressures on opposite surfaces of the piston after said valve closure member has been moved to closed position to cause the piston to move the closure member to open position.

7. A safety device of the character set forth in claim 4 including, a frangible member between the rod and the cylinder exteriorly of said cylinder for restraining movement of the piston to which said rod is connected in a direction moving the valve closure member toward closed position, said frangible member being frangible upon the application of a predetermined fluid pressure differential to said piston to permit the piston to move the closure member to closed position.

8. A safety device adapted to be mounted in a fluid flow conductor for automatically shutting off fluid flow through said conductor under predetermined conditions and including, a housing adapted to be connected in the flow conductor and having a flow passage therethrough, valve means movable in the housing for controlling flow through said passage, a cylinder carried by the housing, a piston movable in the cylinder and having a stem connecting it with the valve means for actuating the same, a member connected to the surface of said piston opposite the stem and extending exteriorly of the cylinder whereby the effective area of such surface of the piston is reduced, a flow restricting device connected with the valve housing flow passage for reducing the pressure of fluids flowing through the passage, a conductor communicating with the fluid flow conductor upstream of the flow restricting device and with the cylinder on the side of the piston having the exposed member connected thereto, a second conductor communicating with the fluid flow conductor downstream of the flow restricting device and with the cylinder on the side of the piston opposite the exposed member whereby the piston is moved in response to the differential in pressures applied to the opposite surfaces of the piston and reduction in pressure downstream of the restricting device will increase the differential to cause the piston to operate the valve member automatically to close the same to shut off flow of fluid through the housing and flow conductor.

9. A safety device including, a housing having a flow passage therethrough and adapted to be connected in a flow conductor, valve closure means movable in said housing for controlling flow through said passage, a cylinder connected with the housing, a valve stem connected at one end with the valve closure member and extending outwardly through the cylinder and having its opposite end exposed to atmospheric pressure exteriorly of the cylinder, said stem having a piston secured thereto and slidable longitudinally in the cylinder, packing at opposite ends of the cylinder sealing between the valve stem and said ends of said cylinder, the cross-sectional area of the valve stem exposed to atmospheric pressure being greater than the cross-sectional area of the stem extending through the opposite end of the cylinder and connected with the valve closure means, whereby the effective area of the face of the piston opposite the valve closure means is less than the effective area of the face of the piston nearest the valve closure means, flow restricting means connected in the flow conductor for creating a pressure reduction in fluids flowing through said conductor, means for conducting fluid pressure from upstream of said flow restricting means to the cylinder to act on the face of the piston opposite the valve closure means, and means for conducting fluid pressure from downstream of said flow restricting means to the cylinder to act on the face of the piston nearest said valve closure means, whereby the pressure differential in the cylinder induced by the flow restricting means acts upon the piston to actuate the valve closure means, the difference in effective areas of the opposite faces of the piston determining the pressure differential required to operate the valve.

10. A safety device including, a housing having a flow passage therethrough and adapted to be connected in a flow conductor, valve means in said housing for controlling flow through said passage, flow restricting means connected in the flow conductor for creating a pressure reduction in fluids flowing through said flow conductor, actuating means comprising a cylinder and a piston movable therein, said piston being connected to said valve means and having opposed areas exposed to fluid pressures from upstream and downstream of the flow restricting means for operating said valve means in response to the differential in pressures applied to said piston, and restraining means for restraining said actuating means against closing movement of said valve means until a predetermined pressure differential has been applied to said piston, said restraining means including a member connected to one of the opposed areas of the piston opposite the valve means connection and having a surface exposed to atmospheric pressure exteriorly of the cylinder whereby the effective area of the piston to which the exposed member is connected is reduced to less than the effective area of the other of the opposed piston areas so that the pressure differential which must be applied to the piston to move the valve means is determined by the difference between said area to which the exposed member is connected and the other of the opposed piston areas.

11. In a safety device of the character set forth in claim 9, a frangible member exteriorly of the cylinder connected to the exposed end of the valve stem for restraining said piston against operation of the valve closure means and shearable when a predetermined pressure differential has been applied to the piston.

HERBERT C. OTIS.

REFERENCES CITED

The following references are of record in the file of this patent:

UNITED STATES PATENTS

| Number | Name | Date |
|---|---|---|
| 24,408 | Belliss et al. | Jan. 25, 1906 |
| 938,574 | Goldsmith | Nov. 2, 1909 |
| 1,874,019 | Mangiamelli | Aug. 30, 1932 |
| 2,227,297 | Coy | Dec. 31, 1940 |

FOREIGN PATENTS

| Number | Country | Date |
|---|---|---|
| 109,350 | Switzerland | June 1, 1925 |
| 193,193 | Germany | Dec. 16, 1907 |